March 25, 1969 J. M. HARTZ ETAL 3,435,160

PUSHBUTTON SIGNALING ARRANGEMENT

Filed Dec. 13, 1965 Sheet 1 of 2

INVENTORS
Joseph M. Hartz
Sigitas Miknaitis
Carl W. Vogel

BY C. A. Gulbrandsen
Atty.

INVENTORS
Joseph M. Hartz
Sigitas Miknaitis
Carl W. Vogel

BY C. A. Gullbrandsen
Atty.

United States Patent Office 3,435,160
Patented Mar. 25, 1969

3,435,160

PUSHBUTTON SIGNALING ARRANGEMENT

Joseph M. Hartz, Elmhurst, Sigitas Miknaitis, Chicago, and Carl W. Vogel, Evanston, Ill., assignors to Automatic Electric Laboratories, Inc., Northlake, Ill., a corporation of Delaware Filed Dec. 13, 1965, Ser. No. 513,409
Int. Cl. H04m 1/02
U.S. Cl. 179—179 5 Claims

ABSTRACT OF THE DISCLOSURE

An illuminated key switching assembly for a telephone set having keys and an integrally molded upper housing unit of transparent material for pushbuttons and a designation strip. A lower integrally molded housing has separate compartments to confine the light to a particular pushbutton and corresponding area of the designation strip.

This invention relates in general to key telephone sets and more particularly of the kind wherein an indication is given of the operating condition of the different lines.

It has been the practice in certain types of key telephone sets, as for example, those which handle one or more intercom or trunk lines, to provide lamp indicators, one for each key, to indicate on which line a call is coming in or which lines may be busy at the time a call is to be originated. In a known telephone set of this kind, a separate lampshield mounted on a bracket attached to the telephone base is provided for each key and lamp pair. The lampshield which also serves as a pushbutton guide is of transparent material, with its lower portion painted in order to limit the light rays to the particular key. Associated with the keys is a designation strip held in place by a separate cover attached to the telephone housing.

It is an object of the invention to provide an instrument assembly consisting of a minimum of individual parts, thus providing for a simple and economical construction and ease of maintenance.

Another object of the invention is to illuminate the pushbutton and its associated designation plate or strip directly by the activated indicator lamp and simultaneously block any light from escaping and illuminating the adjacent pushbuttons or designation plates.

One feature of the invention resides in a unitary multi-compartment lampshield mounted in close proximity to the plurality of lamps, each compartment having the tip of a lamp projecting thereinto. The lampshield mounted to the key assembly and having its walls extend to the telephone housing forms a plurality of compartments so that the light rays from the particular activated lamp are restricted to that particular compartment, illuminating the particular pushbutton and also directly illuminating the particular designation strip.

Another feature of the invention is a unitary construction of the pushbutton guide and designation strip cover, preferably with integrally molded prongs at the bottom of each pushbutton guide to retain the pushbutton in the guide for easier handling during the assembly and maintenance.

Another feature relates to a unique method of attaching the pushbutton frame assembly, whereby each end has an integrally molded detent, which by slightly bowing the assembly at the center and pressing it into the telephone housing provides a simple snap action fastener.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–10 wherein.

Figure 1:
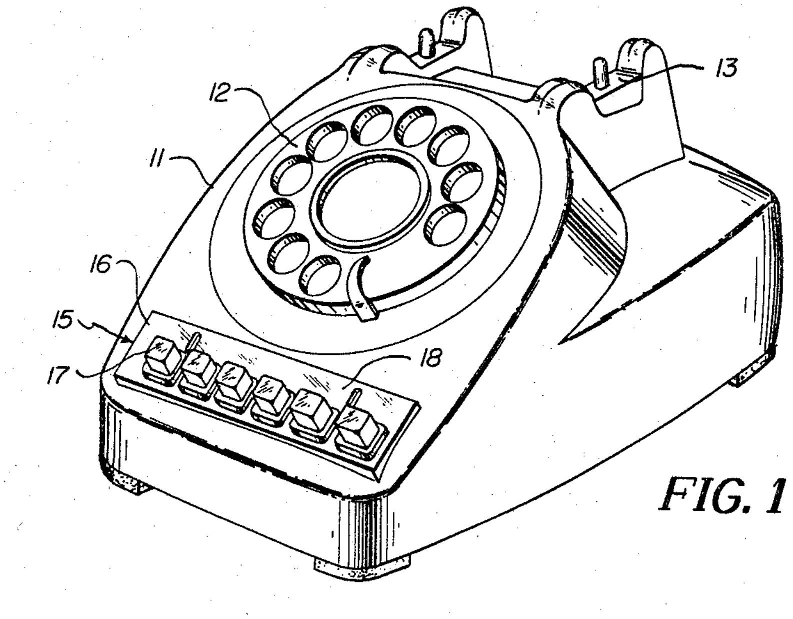
FIG. 1 is a perspective view of a telephone set embodying features of the invention.

As shown in FIG. 1, a telephone set equipped with a shell 11, a calling dial 12, and a cradle 13, is provided with an illuminated key switching assembly 15. The upper housing unit 16 of the assembly, with the plurality of pushbuttons 17 inserted therein, is affixed to shell 11 so that the portion of said unit 16, comprising the designation strip cover 18 and a plurality of pushbutton guides 28, extends above shell 11.

Figure 3:
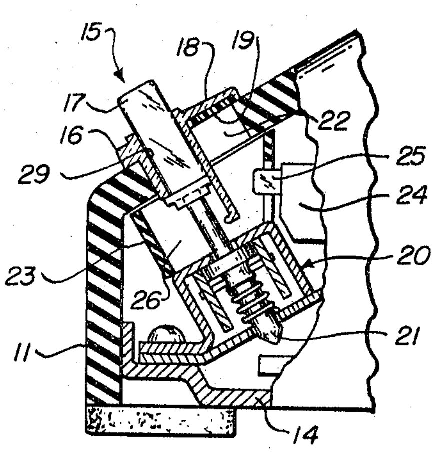
FIG. 3 is a partial sectional view through one of the switching keys.

As illustrated in FIG. 3, multiple key switching assembly 15, located in the telephone set, comprises in addition to the upper housing unit 16, a designation strip 19, a lower housing unit 23, a key assembly 20 with a plurality of keys 21 and a lamp assembly 24. Upper housing unit 16 common to said key assembly 20, affixed to the shell 11, has a plurality of pushbutton guides 28; each guide 28 with a pushbutton 17 inserted therein, projects into its corresponding aperture 22 in shell 11. Designation strip 19 common to said key assembly 20 is positioned under a designation strip cover 18 and rests on the webs 39 of shell 11. Lower housing unit 23 is of a multi-compartment construction and is mounted to the frame of the key assembly 20 in close proximity to lamp assembly 24.

Figure 8:
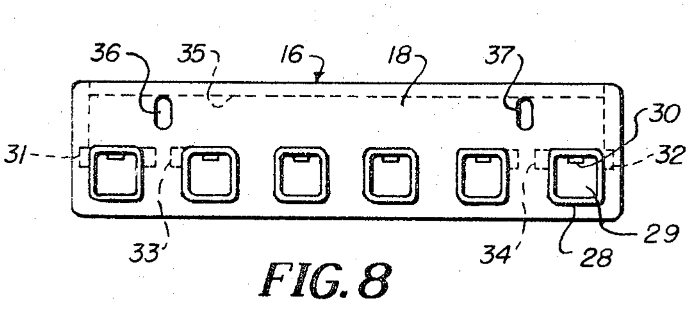
FIG. 8 is a top view of the pushbutton guide and designation strip cover.
Figure 10:
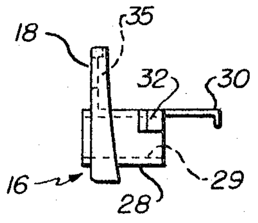
FIG. 10 is a side view of the pushbutton guide and designation strip cover.
Figure 9:
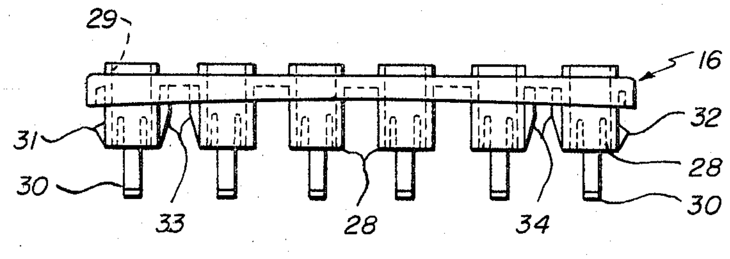
FIG. 9 is a front view of the pushbutton guide and designation strip cover.

Referring now to FIGS. 8, 9 and 10 it can be seen that the upper housing 16 is molded as a single unit. Integrally molded therewith is a multiple of pushbutton guides 22 each having an aperture 29, which is slightly larger than the pushbutton, allowing for an easy travel of the pushbutton; each pushbutton guide also has a pushbutton retaining prong 30. Integrally molded to the outside of the end guides 28 are mounting detents 31 and 32, and integrally formed between the end guide portions and the guide portions adjacent thereto are a set of guiding rectangular sloping ridges 33 and 34. Under the designation strip cover 18 a cavity 35 is provided to receive the designation strip 19. Apertures 36 and 37 are provided for easy removal of the designation strip 19 without the necessity of disassembling the unit.

Figure 4:
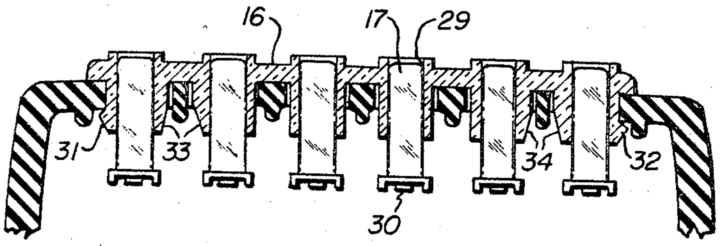
FIG. 4 is a partial sectional view showing the pushbutton frame assembly positioned into the telephone housing.

To insert pushbuttons 17 into the unit 16 a slight bending of the prong 30 away from the aperture 29 is required. When released, prong 30 retains the pushbutton in the guide 28. As can be seen in FIG. 4, once the pushbuttons are inserted into the unit 16, the assembly can be treated as one unit thus simplifying the handling and the assembly to the telephone set.

Figure 2:
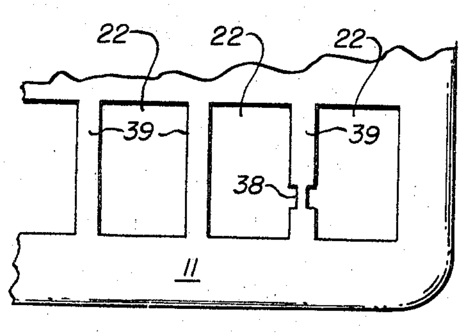
FIG. 2 is a partial top view of the telephone shell showing the apertures for the pushbutton assembly.

Referring to FIGS. 2 and 4 it will be understood how the upper housing unit 16 with the pushbuttons 17 inserted therein is uniquely mounted to the telephone housing 11. Housing 11 has a plurality of apertures 22 separated by webs 39. In the first web in from each end is a guiding slot 38. Each pushbutton guide 28 is inserted into its respective aperture 22, guiding rectangular sloping ridges 33 and 34 with their associated slots 38 provide aligning means for the desired location of the unit on the telephone housing 11. By slightly bowing the unit 16 in the center and pressing down at the ends unit 16 snaps into position on the housing 11 with detents 31 and 32 providing holding means.

Figure 5:
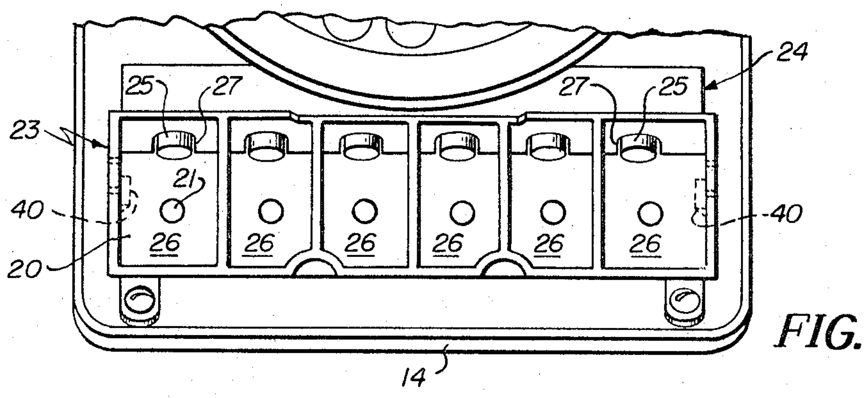
FIG. 5 is a partial top view of a telephone base showing the lampshield mounted thereto.
Figure 6:
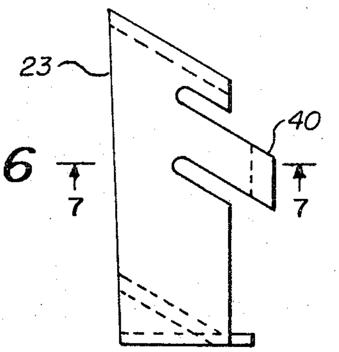
FIG. 6 is an end view of the lampshield as shown in FIG. 5.
Figure 7:
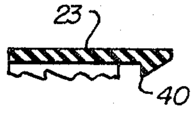
FIG. 7 is a section taken along the line 7—7 of FIG. 6.

FIGS. 6 and 7 show the lower housing unit 23 and FIG. 5 shows unit 23 affixed to key assembly 20 by a pair of hooks 40. The lower housing 23 is molded as a single unit having a plurality of compartments 26. Projecting into each compartment are the keys 21 and the tips of lamps 25.

The pushbuttons 17 and the upper housing unit 16 are required to be of a material having high clarity and high index of refraction in order to insure good transmission of light rays to the upper portion of the button. Among the materials suitable for this purpose are acrylic resins, styrene resins and quartz. The lower housing unit 23 is composed of a substantially opaque or light dispersive material, or a transparent material with a light dispersive surface. When the units are assembled to the telephone as shown in FIG. 3 and when the lamp 25 is energized, the light rays are restricted to the particular compartment so that an illuminated spot appears on substantially only the designation strip and the pushbutton associated with that particular lamp.

As is evident from the foregoing description the unitary construction of the upper housing and the unitary construction of the multi-compartment lower housing provied the necessary illumination in an assembly that is economical to manufacture and maintain.

While the principles of the invention have been described in connection with a specific apparatus, it is to be clearly understood that this description is made only by way of example and not necessarily as a limitation to the scope of the invention.

What is claimed is:

1. An illuminated key switching assembly for a telephone set having an outer shell, said assembly comprising a plurality of keys each having a pushbutton formed of transparent material, an integrally molded upper housing unit formed of transparent material and having a like plurality of guides receiving said pushbuttons and including a flange for receiving a designation strip, a designation strip, said upper housing being mounted in an opening in said shell so as to extend exteriorly thereof and to retain said designation strip between said flange and said shell, an integrally molded lower housing unit formed of substantially opaque material and having a like plurality of compartments, said lower housing unit being mounted within said shell below said upper housing in a position to receive in said compartments respective ones of said pushbuttons, and a like plurality of lamps respectively individual to said pushbuttons, said lamps being mounted within said shell with the tips thereof protruding into a corresponding compartment whereby light emitted from each lamp is restricted to its respective compartment to thereby illuminate the corresponding pushbutton and only that portion of the designation strip associated therewith.

2. An illuminated key switching assembly in accordance with claim 1 wherein said shell has a plurality of openings formed therein, one for each pushbutton, separated by webs and each having a dimension in the direction parallel to said webs at least as great as the width of said flange, said webs forming a support for said designation strip and further confining the light emitted from said lamps to its respective pushbutton and to that portion of the designation strip associated therewith.

3. An illuminated key switching assembly in accordance with claim 1 wherein said flange of said upper housing unit has two slots formed therein for receiving a tool for extracting said designation strip.

4. An illuminated key switching assembly in accordance with claim 1 wherein said guides for said pushbuttons protrude above and below said shell, and a button retaining prong is integrally molded at the lower end of each of said guides.

5. An illuminated key switching assembly for a telephone set having an outer shell, said shell having a plurality of rectangular openings therein separated by webs, said assembly comprising a plurality of keys each having a push button of rectangular cross-section formed of transparent material, an integrally molded upper housing unit formed of transparent material having rectangular guides for receiving and guiding said pushbuttons, a flange for receiving a designation strip, a button retaining prong integrally molded to one end of each of said guides, a detent formed at each end of said unit for engaging the inner surface of said shell, and two sets of ridges respectively formed between the guides at the ends of said unit and the next adjacent guides; a designation strip; said upper unit being removably secured to said shell by said detents with said guides extending through said openings with said flange positioned exteriorly of said shell and retaining said designation strip between said flange and said shell; an integrally molded lower housing unit formed of substantially opaque material and having a like plurality of compartments, said lower housing unit being mounted within said shell below said upper housing unit in a position to receive in said compartments respective ones of said pushbuttons; and a like plurality of lamps respectively individual to said buttons mounted within said shell with the tips thereof extending into a corresponding compartment of said lower housing unit, said ridges on said upper housing unit engaging a pair of said webs and aligning said pushbuttons with their respective lamps.

References Cited

UNITED STATES PATENTS

| | | | |
|---|---|---|---|
| 2,218,328 | 10/1940 | Curran et al. | 179—99 |
| 2,780,677 | 2/1957 | Schaufuss | 179—99 |

WILLIAM C. COOPER, *Primary Examiner.*

J. S. BLACK, *Assistant Examiner.*

U.S. Cl. X.R.

179—100; 200—5